United States Patent Office 2,755,899
Patented July 24, 1956

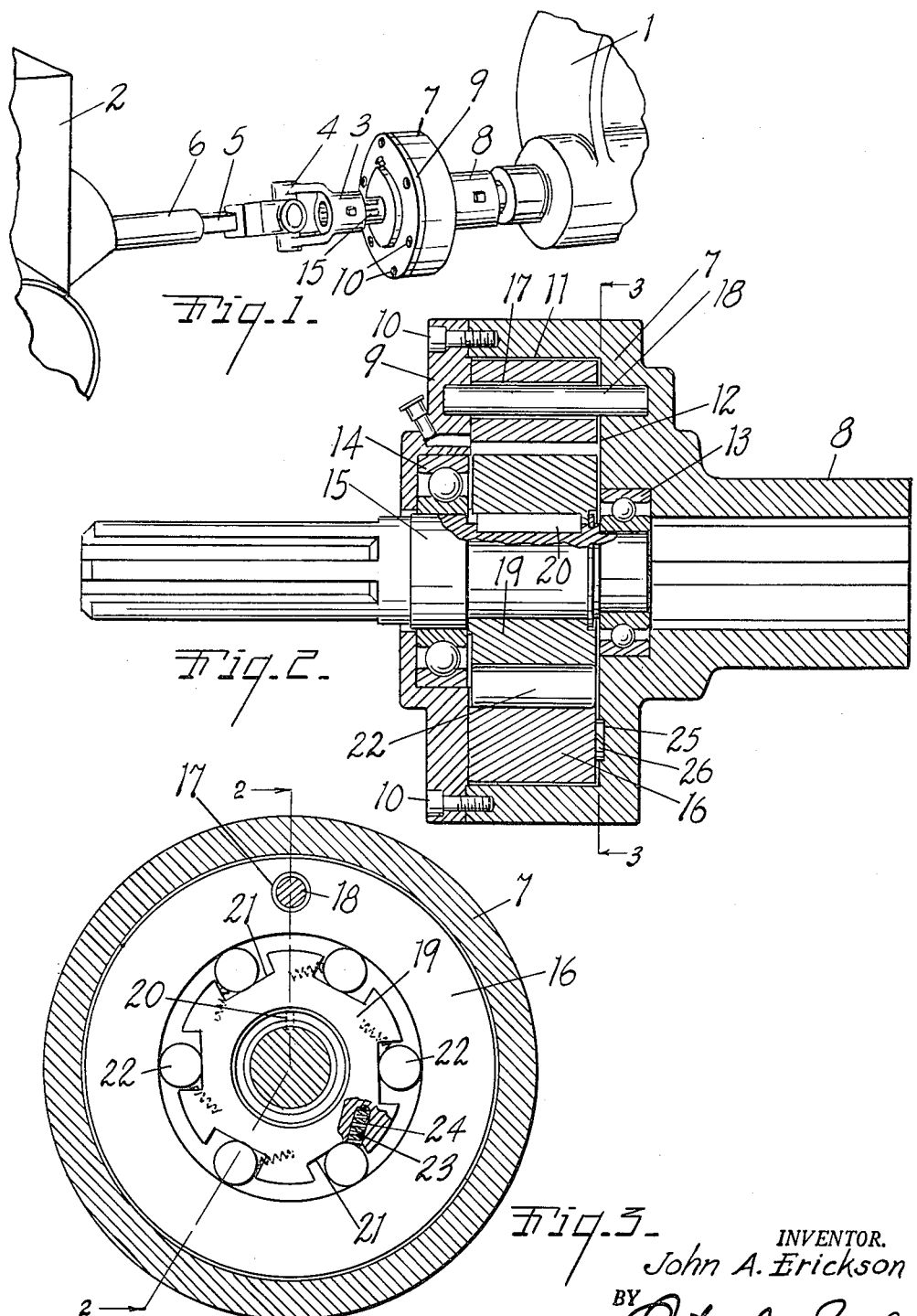

2,755,899

OVERRUNNING OR ONE-WAY CLUTCHES OF THE ONE-WAY ENGAGING DETENT TYPE

John A. Erickson, Manhattan, Kans., assignor to Viking Manufacturing Company, Manhattan, Kans.

Application September 16, 1953, Serial No. 380,448

8 Claims. (Cl. 192—45)

This invention relates to overrunning or one-way clutches of the one-way engaging detent types.

The main objects of this invention are:

First, to provide an overrunning clutch which is well adapted for use in transmitting heavy loads and is capable of sustaining severe shocks and sudden impact loads such as occur, for example, in the transmission connection for a tractor to a trailing tractor driven machine.

Second, to provide an overrunning or one-way clutch of the roller detent type in which effective driving engagement of the clutch parts is assured with a minimum of shock and strain on the clutch and its bearings.

Third, to provide an overrunning or one-way clutch which is compact and one in which the stresses on the cooperating parts are well distributed.

Objects relating to details and economies of the invention will appear from the description to follow. The invention is defined and pointed out in the claims.

A preferred embodiment of the invention is illustrated in the accompanying drawing, in which:

Fig. 1 is a fragmentary perspective view of an embodiment of my invention in operative relation to a tractor and to a machine driven thereby; the hitch or draw bar connection for the tractor to the machine not being illustrated.

Fig. 2 is an enlarged fragmentary view of the clutch of my invention mainly in longitudinal section on a line corresponding to broken line 2—2 of Fig. 3.

Fig. 3 is a transverse section on a line corresponding to 3—3 of Fig. 2.

In the accompanying drawing 1 represents a tractor and 2 a machine powered thereby. The draft connection for the tractor to the machine is not illustrated. The power take-off shaft is generally designated by the numeral 3 and includes a universal joint 4 and telescoping sections 5 and 6. As these parts form no part of my invention they are not detailed herein.

The overrunning clutch of my invention comprises a first clutch member 7 having a socket 8 for the driving shaft 9, the clutch member 7 being the driving member of the clutch.

In the embodiment illustrated the end plate 9 of this member 7 is detachably secured by means of the screw bolts 10. The member 7 is chambered and constitutes a housing member of the clutch. The chamber has a cylindrical wall 11, the end wall 12 of the chamber being parallel to the inner face of the end wall 9. The housing member 7 is provided with a roller bearing 13 while the end wall 9 is provided with a roller bearing 14 for the driven shaft 15.

The annular clutch element 16 is disposed in the chamber of the clutch housing member 7 and is of a diameter less but approximating that of the chamber. This relationship being best shown in Fig. 3. However, it will be understood that the parts are not illustrated in the position usually occupied thereby when the clutch is transmitting a load.

The member 16 is provided with an axially disposed bore 17 adjacent one side thereof and receiving the pin 18 fixedly mounted on the end walls of the clutch housing member 7. The diameter of the bore 17 somewhat exceeds the diameter of the pin 18. This connection for the member 16 to the clutch housing member 7 provides for limited floating movement of the member 16 relative to the clutch housing member 7 and also relative to the clutch member 19 which, in the embodiment illustrated is the driven clutch member.

The member 19 is secured to the shaft 15 by the key 20. The member 19 is provided with a plurality of angularly spaced slightly cammed seats 21 for the clutch rollers 22. Coil springs 23 are disposed in the bores 24 to coact with the clutch rollers urging them towards engaging position. By thus mounting the annular clutch member of the clutch housing member 7 it can center itself or adjust itself so that all of the roller detents engage with equal pressure and without objectionable side or radial thrust on the bearings 13 and 14.

To prevent chatter and vibration of the annular member within the chamber of the clutch housing member in which it is mounted I provide the wall 12 of the chamber with a plurality of angularly spaced recesses 25, only one of which is shown, to receive the spring members 26 which may desirably be spring washers. These act to frictionally urge the annular member 16 axially against the head member 19, the annular member is however free to adjust itself for the purpose stated.

Clutches embodying my invention are well adapted for use in connection with farm tractors and machines driven thereby which are commonly subjected to heavy loads and severe shocks. The annular member is in effect a load transmitting element in the clutch and while it is effectively supported to transmit the load it automatically adjusts or centers itself relative to the coacting clutch housing member thereby minimizing the shocks and effectively distributing the strain on the parts even after being subjected to very considerable wear.

I have illustrated and described my invention in a very simple and practical embodiment thereof. I have not attempted to illustrate or describe various modifications and adaptations which I contemplate as it is believed that this disclosure will enable those skilled in the art to embody or adapt my invention as may be desired.

Having thus described my invention, what I claim as new and desire to secure by Letters Patent is:

1. An overrunning clutch comprising a first clutch member constituting a housing and having an internally cylindrical chamber with spaced parallel side walls, an annular element of a diameter less but approximating that of said clutch member chamber and having an axial bore at one side thereof, a pin carried by said first clutch member disposed through said bore, the bore being of the diameter exceeding but approximating the diameter of the pin whereby the annular element is connected to said first clutch member for limiting floating movement relative thereto, a second clutch member disposed within said annular element and having a plurality of angularly spaced outwardly facing camming surfaces, clutch rollers disposed within said annular element in coacting relation to said camming surfaces of said second clutch member, said first clutch member being provided with ball bearings for said second clutch member, said first clutch member having angularly spaced inwardly opening seats in one side wall thereof, and spring members arranged in said seats in thrust engagement for said annular element for urging the annular element frictionally against the other side wall.

2. An overrunning clutch comprising a first clutch member constituting a housing and having an internally cylindrical chamber, an annular element of a diameter less but approximating that of said first clutch member chamber and having an axial bore at one side thereof, a pin carried by said first clutch member disposed through said bore, the bore being of the diameter exceeding but approximating the diameter of the pin whereby the annular element is connected to said first clutch member for limiting floating movement relative thereto, a second clutch member disposed within said annular element and having a plurality of angularly spaced outwardly facing camming surfaces, clutch rollers disposed within said annular element in coacting relation to said camming surfaces of said second clutch member, said first clutch member being provided with ball bearings for said second clutch member.

3. An overrunning clutch comprising a first clutch member having an internally cylindrical chamber with spaced parallel side walls, and an annular element of a diameter less but approximating that of said first clutch member chamber and having a bore at one side thereof, a pin carried by said first clutch member disposed through said bore, the bore being of the diameter exceeding but approximating the diameter of the pin whereby the annular element is connected to said first clutch member for limiting floating movement relative thereto, a second clutch member disposed within annular element, one-way engaging detents disposed between said annular element and said second clutch member, said first clutch member being provided with bearings for said second clutch member, said first clutch member having angularly spaced inwardly opening seats in one side wall thereof and spring members arranged in said seats in thrust engagement for said annular element for urging the stator member frictionally against the other side wall.

4. An overrunning clutch comprising a first clutch member having an internally cylindrical chamber, and an annular element of a diameter less but approximating that of said first clutch member chamber and having a bore at one side thereof, a pin carried by said first clutch member disposed through said bore, the bore being of the diameter exceeding but approximating the diameter of the pin whereby the annular element is connected to said first clutch member for limiting floating movement relative thereto, a second clutch member disposed within said annular element, one-way engaging detents disposed between said annular element and said second clutch member, said first clutch member being provided with bearings for said second clutch member.

5. An overrunning clutch comprising a first clutch member, a second clutch member disposed within said first clutch member, an annular element disposed in surrounding relation to said second clutch member, said second clutch member having a plurality of angularly spaced outwardly facing camming surfaces, roller detents disposed with said said annular element in coacting relation thereto and with said cam surfaces of said second clutch member, said first clutch member being provided with roller bearings for said second clutch member, said annular element being connected to said first clutch member for rotation therewith while permitting floating adjustment relative to the axis of the clutch and means for frictionally holding said annular element against said first clutch member.

6. An overrunning clutch comprising a first clutch member, a second clutch member disposed within said first clutch member, an annular element disposed in surround relation to said second clutch member, said second clutch member having a plurality of angularly spaced outwardly facing camming surfaces, roller detents disposed within said annular element in coacting relation thereto and with said cam surfaces of said second clutch member, said first clutch member being provided with roller bearings for said second clutch member, said annular element being connected to said first clutch member for rotation therewith while permitting floating adjustment relative to the axis of the clutch.

7. An overrunning clutch comprising a first clutch member, a second clutch member disposed within said first clutch member, an annular element disposed in surrounding relation to said second clutch member, one-way engaging detent connections for said annular element and said second clutch member, said first clutch member being provided with bearings for said second clutch member, said annular element being connected to said first clutch member for rotation therewith and to permit floating centering adjustment relative to the axis of the clutch, and means for yieldably urging said annular element against said first clutch member.

8. An overrunning clutch comprising a first clutch member, a second clutch member disposed within said first clutch member, an annular element disposed in surrounding relation to said second clutch member, and one-way engaging detent connections for said annular element and said second clutch member, said first clutch member being provided with bearings for said second clutch member, said annular element being connected to said first clutch member for rotation therewith and to permit floating centering adjustment relative to the axis of the clutch.

References Cited in the file of this patent

UNITED STATES PATENTS

| | | |
|---|---|---|
| 933,494 | Slaight et al. | Sept. 7, 1909 |
| 1,971,655 | Morier | Aug. 28, 1934 |
| 2,019,828 | Penati | Nov. 5, 1935 |
| 2,038,986 | Browne | Apr. 28, 1936 |
| 2,038,987 | Browne | Apr. 28, 1936 |
| 2,140,737 | Dickens | Dec. 20, 1938 |
| 2,504,173 | Banker | Apr. 18, 1950 |